US012777448B2

(12) United States Patent
Bechthum et al.

(10) Patent No.: US 12,777,448 B2
(45) Date of Patent: Oct. 27, 2026

(54) WIRELESS COMMUNICATION DEVICE, SYSTEM AND METHOD WITH LOCALIZATION CAPABILITIES

(71) Applicant: STICHTING IMEC NEDERLAND, Eindhoven (NL)

(72) Inventors: Elbert Bechthum, Veldhoven (NL); Johan van den Heuvel, Geldrop (NL)

(73) Assignee: Stichting IMEC Nederland, Eindhoven (NL)

( * ) Notice: Subject to any disclaimer, the term of this patent is extended or adjusted under 35 U.S.C. 154(b) by 818 days.

(21) Appl. No.: 17/936,290

(22) Filed: Sep. 28, 2022

(65) Prior Publication Data

US 2023/0199698 A1 Jun. 22, 2023

(30) Foreign Application Priority Data

Dec. 17, 2021 (EP) .................................... 21215380

(51) Int. Cl.
*H04W 24/00* (2009.01)
*G01S 5/04* (2006.01)
(Continued)

(52) U.S. Cl.
CPC ............... *H04W 64/00* (2013.01); *G01S 5/04* (2013.01); *G01S 5/06* (2013.01); *H04W 56/0015* (2013.01)

(58) Field of Classification Search
CPC ..... H04W 64/00; H04W 56/0015; G01S 5/04; G01S 5/06; G01S 5/14; G01S 5/0205;
(Continued)

(56) References Cited

U.S. PATENT DOCUMENTS 9,031,593 B2 * 5/2015 Liao ....................... H04W 56/00 455/445
10,285,156 B2 * 5/2019 Kumar .................. H04L 5/0051
(Continued)

FOREIGN PATENT DOCUMENTS

WO WO-2020144572 A1 * 7/2020 ...... H04W 36/00837
WO WO-2022211692 A1 * 10/2022 ............ H04W 64/00
WO WO-2022236703 A1 * 11/2022 ........... H04L 5/0053

OTHER PUBLICATIONS

Extended European Search Report and Written Opinion, European Patent Application No. EP21215380.3, mailed Jun. 15, 2022; 13 pages.

(Continued)

*Primary Examiner* — Marceau Milord
(74) *Attorney, Agent, or Firm* — McDonnell Boehnen Hulbert & Berghoff LLP

(57) ABSTRACT

A wireless communication device with localization capabilities comprises a first receive chain for receiving a first signal from a first static communication node, and at least a second receive chain for receiving at least a second signal from at least a second static communication node. The first and at least one second receive chains are configured to simultaneously receive the first and at least one second signals. The wireless communication device is configured to determine a first distance between the wireless communication device and the first static communication node on the basis of the first signal, determine at least a second distance between the wireless communication device and the at least one second static communication node on the basis of the at least one second signal, and determine a location of the wireless communication device on the basis of the first and least one second distances.

22 Claims, 10 Drawing Sheets

(51) Int. Cl.

| | |
|---|---|
| ***G01S 5/06*** | (2006.01) |
| ***H04W 56/00*** | (2009.01) |
| ***H04W 64/00*** | (2009.01) |

(58) Field of Classification Search

CPC ...... G01S 5/0221; G01S 7/0232; G01S 7/285; G01S 7/352; G01S 13/76; G01S 11/06; G01S 13/84; G01S 13/876

See application file for complete search history.

(56) References Cited

U.S. PATENT DOCUMENTS

| | | | | |
|---|---|---|---|---|
| 11,044,693 | B1 * | 6/2021 | Gummadi | G01S 5/06 |
| 11,601,911 | B2 * | 3/2023 | Sadiq | G01S 5/10 |
| 11,802,936 | B2 * | 10/2023 | Hallonsten | G01S 5/0081 |
| 11,894,919 | B2 * | 2/2024 | Pon | G01S 19/32 |
| 11,914,049 | B2 * | 2/2024 | Pon | G01S 19/256 |
| 2003/0103475 | A1 * | 6/2003 | Heppe | H04W 56/006 370/321 |
| 2009/0279594 | A1 * | 11/2009 | Muhammad | G06F 9/4812 375/219 |
| 2011/0250926 | A1 * | 10/2011 | Wietfeldt | H01Q 1/243 455/525 |
| 2013/0231064 | A1 | 9/2013 | Gudem et al. | |
| 2015/0195674 | A1 * | 7/2015 | Opshaug | G01S 5/02 455/456.6 |
| 2015/0323674 | A1 * | 11/2015 | Wu | G01S 5/0027 455/456.5 |
| 2017/0170851 | A1 | 6/2017 | Dorosenco | |
| 2018/0132252 | A1 * | 5/2018 | Islam | H04B 7/0617 |
| 2018/0295600 | A1 * | 10/2018 | Kumar | H04L 5/0051 |
| 2019/0364536 | A1 * | 11/2019 | Sadiq | G01S 5/10 |
| 2020/0322756 | A1 * | 10/2020 | Sosnin | H04W 4/029 |
| 2021/0022105 | A1 * | 1/2021 | Yu | H04W 64/00 |
| 2021/0194784 | A1 * | 6/2021 | Manolakos | G01S 5/02213 |
| 2021/0282107 | A1 | 9/2021 | Henry et al. | |
| 2022/0015051 | A1 * | 1/2022 | Duan | G01S 1/024 |
| 2022/0053450 | A1 * | 2/2022 | Khoryaev | H04L 5/0048 |
| 2022/0321163 | A1 * | 10/2022 | Avraham | H04B 1/525 |
| 2023/0239717 | A1 * | 7/2023 | Gao | H04B 7/18563 370/252 |
| 2024/0163929 | A1 * | 5/2024 | Turtinen | H04B 7/18558 |
| 2024/0305423 | A1 * | 9/2024 | Lyazidi | H04L 5/0051 |
| 2025/0071725 | A1 * | 2/2025 | Gummadi | H04W 64/003 |
| 2025/0227649 | A1 * | 7/2025 | Manolakos | H04W 64/00 |

OTHER PUBLICATIONS

Tianyu Wang, Hanying Zhao, and Yuan Shen; "An efficient single-anchor localization method using ultra-wide bandwidth systems;" Applied Sciences 2020, 10, 57; published Dec. 19, 2019; 17 pages.

Reinhard Exel; "Receiver design for time-based ranging with IEEE 802.11b signals;" International Journal of Navigation and Observation; vol. 2012, Article ID 743625; 16 pages.

Maximo Cobos, Juan J. Perez-Solano, Oscar Belmonte, German Ramos, and Ana M. Torres; "Simultaneous ranging and self-positioning in unsynchronized wireless acoustic sensor networks;" IEEE Transactions on Signal Processing 64, No. 22 (2016); 12 pages.

Nicola Macoir, Jan Bauwens, Bart Jooris, Ben Van Herbruggen, Jen Rossey, Jeroen Hoebeke, and Eli De Poorter; UWB localization with battery-powered wireless backbone for drone-based inventory management; Sensors 2019, 19, 467; published Jan. 23, 2019; 18 pages.

* cited by examiner

WIRELESS COMMUNICATION DEVICE, SYSTEM AND METHOD WITH LOCALIZATION CAPABILITIES

CROSS-REFERENCE TO RELATED APPLICATIONS

The present application is a non-provisional patent application claiming priority to European Patent Application No. 21215380.3, filed Dec. 17, 2021, the contents of which are hereby incorporated by reference.

FIELD OF THE DISCLOSURE

The disclosure relates to a wireless communication device with localization capabilities, a system comprising such a wireless communication device with localization capabilities and at least two static communication nodes, and/or a corresponding wireless communication method with localization capabilities.

BACKGROUND

Generally, in times of an increasing number of wireless communication applications providing radio frequency based ranging, such as indoor localization and navigation, asset tracking as well as secure access control, there is a growing need of a wireless communication device with localization capabilities, a system comprising such a wireless communication device with localization capabilities and at least two static communication nodes, and/or a corresponding wireless communication method with localization capabilities for performing localization determination exemplarily in the context of such applications in a particularly accurate and efficient manner.

Tianyu Wang et al.: "An Efficient Single-Anchor Localization Method Using Ultra-Wide Bandwidth Systems", Applied Sciences, 2020, 10, 57; doi: 10.3390/app10010057 describes a localization method employing just a single anchor, which disadvantageously leads to a limited accuracy with respect to localization determination especially due to the usage of a single anchor.

SUMMARY

This description describes embodiments related to a wireless communication device with localization capabilities, a system comprising such a wireless communication device with localization capabilities and at least two static communication nodes, and a corresponding wireless communication method with localization capabilities in order to allow for localization determination in a highly accurate manner.

As an example, the description describes features for a wireless communication device with localization capabilities, features for a system comprising a wireless communication device with localization capabilities and at least two static communication nodes, and features of a wireless communication method with localization capabilities. The description describes other related features as well.

According to a first aspect, embodiments directed to a wireless communication device with localization capabilities are provided. The wireless communication device comprises a first receive chain for receiving a first signal from a first static communication node, and at least a second receive chain for receiving at least a second signal from at least a second static communication node. The first receive chain and the at least one second receive chain can be configured to simultaneously receive the first signal and the at least one second signal. Additionally, the wireless communication device can be configured to determine a first distance between the wireless communication device and the first static communication node on the basis of the first signal, determine at least one second distance between the wireless communication device and the at least one second static communication node on the basis of the at least one second signal, and determine a location of the wireless communication device on the basis of the first distance and the at least one second distance.

In accordance with at least some of the example embodiments, the first static communication node and the at least one second static communication node do not need to be synchronous for an accurate localization determination, which, for instance, can lead to a particularly high efficiency.

In accordance with at least some of the example embodiments including the above-mentioned simultaneous reception, the simultaneous reception can reduce a localization determination time, thereby typically increasing efficiency.

With respect to the first static communication node and the at least one second static communication node, the term "static" can be understood in the context of a respective reference system. In other words, for instance, such static communication nodes can be employed in a car in the case that the wireless communication device can be understood to be a corresponding car key, and the car wants to know (e.g., is configured to determine) where/how close the car key is.

In accordance with at least some of the example embodiments, each of the first receive chain and the at least one second receive chain can be configured to tune into a different frequency with respect to each other. In accordance with at least some of those embodiments, a collision of the signals from the static communication nodes can be prevented in a highly efficient manner.

In accordance with at least some of the example embodiments, each of the first receive chain and the at least one second receive chain can be configured to independently generate a corresponding local oscillator signal with respect to each other. In accordance with at least some of those embodiments, the generation of the local oscillator signals can be based on a common reference, such as a common reference for enabling angle-of-arrival measurements.

In accordance with at least some of the example embodiments, the first receive chain can comprise a first phase-locked loop. Additionally or alternatively, the at least one second receive chain can comprise at least a second phase-locked loop. In accordance with at least some of those embodiments, each of the respective phase-locked loops can be provided with a common reference. In at least some embodiments, providing a common reference to each of the respective phase-locked loops can result in receive chains that are sufficiently phase-aligned (i.e., sufficiently phase-aligned receive chains). The receive chains that are sufficiently phase-aligned can provide accurate and efficient angle-of-arrival measurements.

In accordance with at least some of the example embodiments, the first distance is determined on the basis of time-of-flight measurements and/or phase-based ranging and/or signal-strength measurements with respect to the first signal. Additionally or alternatively, the at least one second distance is determined on the basis of time-of-flight measurements and/or phase-based ranging and/or signal-strength measurements with respect to the at least one second signal. The example embodiments can be applied in a flexible manner, which leads to an increased efficiency with special respect to implementation.

In accordance with at least some of the example embodiments, the wireless communication device further comprises at least one transmit chain. In accordance with at least some of those embodiments, the at least one transmit chain can be configured to send a synchronization signal to at least one (for example, each) of the first static communication node and the at least one second static communication node to synchronize the first static communication node and the at least one second static communication node. As an example, the at least one transmit chain can be configured to send a synchronization signal to each of the first static communication node and the at least one second static communication node. In accordance with at least some of these embodiments, due to the synchronization, a single-direction ranging measurement can be sufficient to determine the location of the wireless communication device.

Additionally or alternatively, the at least one transmit chain can be configured to request the first signal from the first static communication node and the at least one second signal from the at least one second static communication node with the aid of a corresponding request signal. As an example, the corresponding request signal comprises a corresponding request signal at the same frequency. As another example, the corresponding request signal comprises a single request signal at the same frequency. As yet another example, the corresponding request signal comprises a single request signal at the same frequency for each of the first communication node and the at least one second static communication node. In accordance with at least some of these embodiments, two-way ranging can be used without the need of synchronizing the static communication nodes. Moreover, with the aid of the single request signal, the signals from the static communication nodes can be requested in parallel.

In accordance with at least some of the example embodiments, the first receive chain comprises a first receive antenna. Additionally or alternatively, the at least one second receive chain comprises at least a second receive antenna. In accordance with at least some of those embodiments, due to the usage of separate receive antennas, angle-of-arrival measurements can also be determined.

In accordance with at least some of the example embodiments, the wireless communication device comprises a single receive antenna. As an example, the single receive antenna can be configured to provide its corresponding receive signal for at least one (e.g., each) of the first receive chain and the at least one second receive chain. Accordingly, by using the single receive antenna, all ranging measurements can be performed with respect to the same antenna. Hence the determined location does not have an orientation dependence with respect to the wireless communication device.

In accordance with at least some of the example embodiments, the wireless communication device further comprises a switch matrix. In accordance with at least some of those embodiments, the switch matrix can be configured to switch at least one (for example, each) of the first receive antenna and at least one second receive antennas so that one of the first receive antenna and the at least one second receive antennas is configured as a single receive antenna providing its corresponding receive signal for at least one (for example, each) of the first and at least one second receive chains. In accordance with at least some of those embodiments, angle-of-arrival measurements can be made, if desired, and the above-mentioned orientation dependency with respect to the wireless communication device can be prevented.

In accordance with at least some of the example embodiments, the at least one second receive chain comprises a second receive chain and a third receive chain. In accordance with those embodiments, the second receive chain and the third receive chain allows for trilateration. In at least some embodiments, the at least one second receive chain comprises a second receive chain, a third receive chain, and at least a fourth receive chain. These latter embodiments allow for a further increased accuracy due to at least four static communication nodes.

In accordance with at least some of the example embodiments, the above-mentioned features regarding the at least one second receive chain can apply in an analogous manner for the second receive chain and the third receive chain and/or for the second receive chain, the third receive chain, and the at least one fourth receive chain, respectively.

According to a second aspect, embodiments directed to a system are provided. The system comprises at least one wireless communication device, such as a wireless communication device according to any of the example embodiment discussed above of the first aspect. The at least one wireless communication device also includes a first static communication node, and at least one second static communication node.

In accordance with at least some of the example embodiments, such as the embodiments discussed in the preceding paragraph, the first static communication node and the at least one second static communication node do not need to be synchronous for an accurate localization determination, which, for instance, can lead to a particularly high efficiency.

With respect to the first static communication node and the at least one second static communication node, as noted above, the term "static" can be understood in the context of a respective reference system.

In accordance with at least some of the example embodiments arranged as a system, at least the first static communication node and the at least one second static communication node are synchronized with respect to each other. In accordance with at least some of these embodiments, due to the synchronization, a single-direction ranging measurement can be sufficient to determine the location of the wireless communication device.

According to a third aspect, a wireless communication method with localization capabilities is provided. The wireless communication method comprises receiving a first signal from a first static communication node with the aid of a first receive chain of a wireless communication device. The method also comprises receiving at least a second signal from at least a second static communication node with the aid of at least a second receive chain of the wireless communication device. The first and at least one second signals can be received simultaneously. The method also comprises determining a first distance between the wireless communication device and the first static communication node on the basis of the first signal. Furthermore, the method includes determining at least a second distance between the wireless communication device and the at least one second static communication node on the basis of the at least one second signal. Furthermore still, the method includes determining a location of the wireless communication device on the basis of the first and at least one second distances.

In accordance with at least some of the example embodiments, such as the embodiments discussed in the preceding paragraph, the first static communication node and the at least one second static communication node do not need to be synchronous for an accurate localization determination, which, for instance, can lead to a particularly high efficiency.

Moreover, the above-mentioned simultaneous reception can reduce a localization determination time, thereby typically increasing efficiency.

With respect to the first static communication node and the at least one second static communication node, as noted above, the term "static" can be understood in the context of a respective reference system.

In accordance with at least some of the example embodiments based on the third aspect, the wireless communication method further comprises tuning into a different frequency with respect to each other with the aid of each of the first receive chain and at the least one second receive chain. Additionally or alternatively, the wireless communication method further comprises independently generating a corresponding local oscillator signal with respect to each other with the aid of each of the first receive chain and the at least one second receive chain.

In accordance with at least some of the example embodiments, such as the embodiments discussed in the preceding paragraph, a collision of the signals from the static communication nodes can be prevented in a highly efficient manner. Moreover, the generation of the local oscillator signals can be based on a common reference, such as a common reference for enabling angle-of-arrival measurements.

In accordance with at least some of the example embodiments based on the third aspect, receiving the at least one second signal from the at least one second static communication node with the aid of the at least one second receive chain of the wireless communication device comprises receiving a second signal and a third signal from a second static communication node and a third static communication node with the aid of a second receive chain and a third receive chain of the wireless communication device. These additional embodiment(s) can be useful for trilateration.

In accordance with at least some of the example embodiments based on the third aspect, determining the at least one second distance between the wireless communication device and the at least one second static communication node on the basis of the at least one second signal comprises determining a second distance between the wireless communication device and the second static communication node on the basis of the second signal, and determining a third distance between the wireless communication device and the third static communication node on the basis of the third signal. These additional embodiment(s) can be useful for trilateration.

In accordance with at least some of the example embodiments based on the third aspect, determining the location of the wireless communication device on the basis of the first distance and the at least one second distance comprises determining the location of the wireless communication device on the basis of the first, second, and third distances. These additional embodiment(s) can be useful for trilateration.

BRIEF DESCRIPTION OF THE FIGURES

The above, as well as additional, features will be better understood through the following illustrative and non-limiting detailed description of example embodiments, with reference to the appended drawings.

All the figures are schematic, not necessarily to scale, and generally only show parts which are necessary to elucidate example embodiments, wherein other parts may be omitted or merely suggested.

DETAILED DESCRIPTION

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

Figure 1:
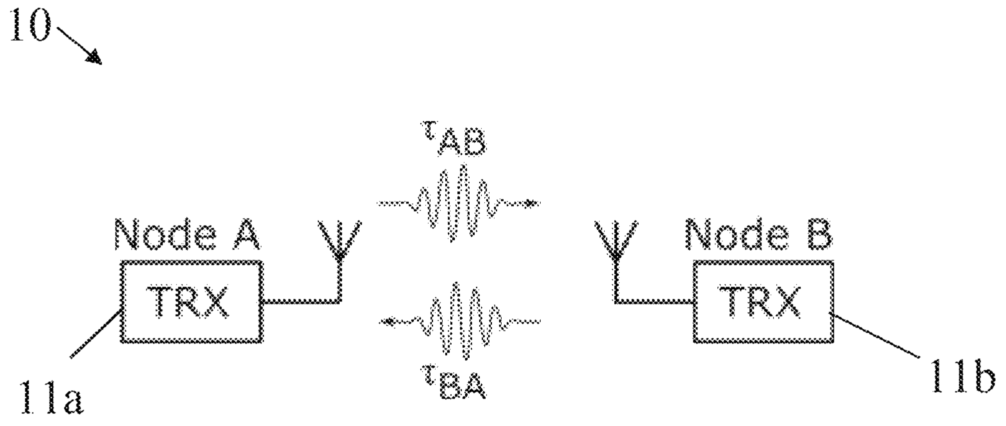
FIG. 1 illustrates a ranging system between two radio-equipped nodes, in accordance with the example embodiments.

With respect to FIG. 1, mobile devices typically feature wireless connectivity. Accurate radio frequency (RF) based ranging (i.e. measuring the range between two radios) is of major importance to enable rapidly emerging applications such as indoor localization and navigation, asset tracking as well as secure access control. A quick and accurate method for measuring the range is to measure the time-of-flight (ToF) of a radio signal. Other methods include phase-based ranging (which may be slower than ToF), or signal-strength based (which may be less accurate than ToF).

FIG. 1 depicts a ranging system 10 for ranging between two radio-equipped nodes 11*a* and 11*b*, in accordance with the example embodiments. In other words, FIG. 1 shows a simplified overview of the ranging system 10. The radio-equipped nodes 11*a*, 11*b* are physically in two different locations and a time it takes for a radio signal to go from the radio-equipped node 11*a* to the radio-equipped node 11*b* (TAB) or vice versa (TBA) is a measure for a distance between the two radio-equipped nodes 11*a*, 11*b*.

To know the location of a mobile node especially in an unambiguous manner, a method called trilateration is used, where the distance to multiple anchor nodes, (for example three anchor nodes or static communication nodes, respectively) is measured to determine the relative location relative to those anchors. Since the location of the anchors is known, the location of the mobile node is also known, which is visualized in FIG. 2.

Figure 2:
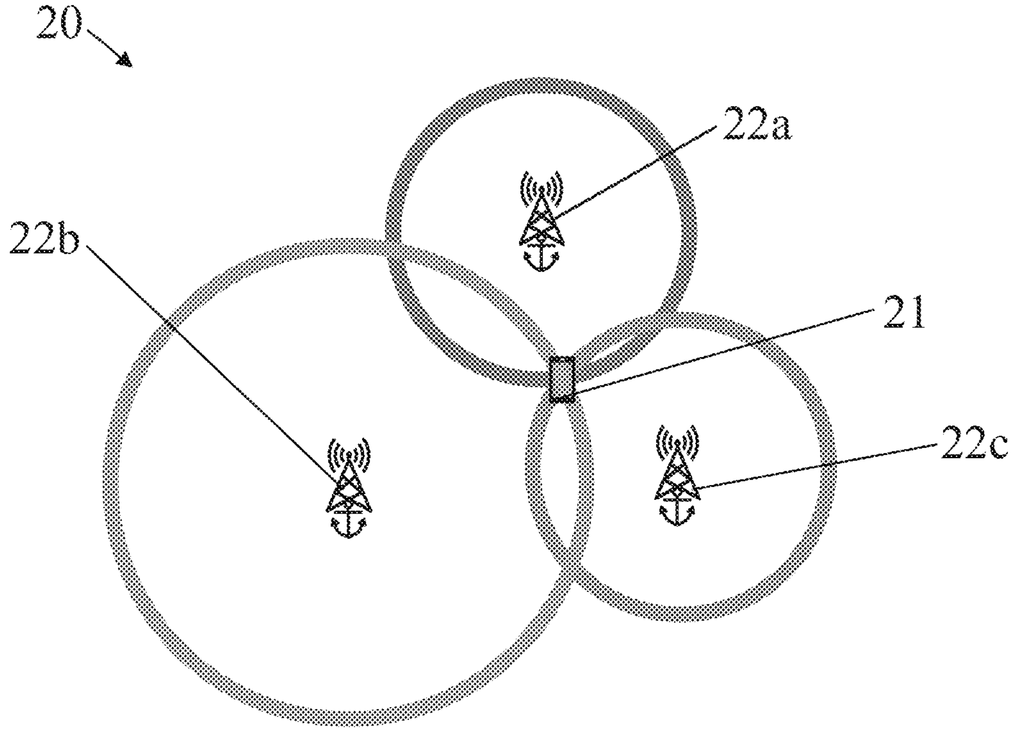
FIG. 2 illustrates a system and use of trilateration for localization of a mobile node, in accordance with the example embodiments.

In this context, FIG. 2 depicts a mobile node or a wireless communication device 21, respectively, and three anchor nodes or three static communication nodes 22*a*, 22*b*, 22*c*, respectively. For the sake of completeness, it is additionally noted that FIG. 2, especially the system 20 thereof, also illustrates an example embodiment of the second aspect of the disclosure in the case if the mobile node or the wireless communication device 21 is configured in a manner according to the first aspect of the disclosure.

Figure 3:
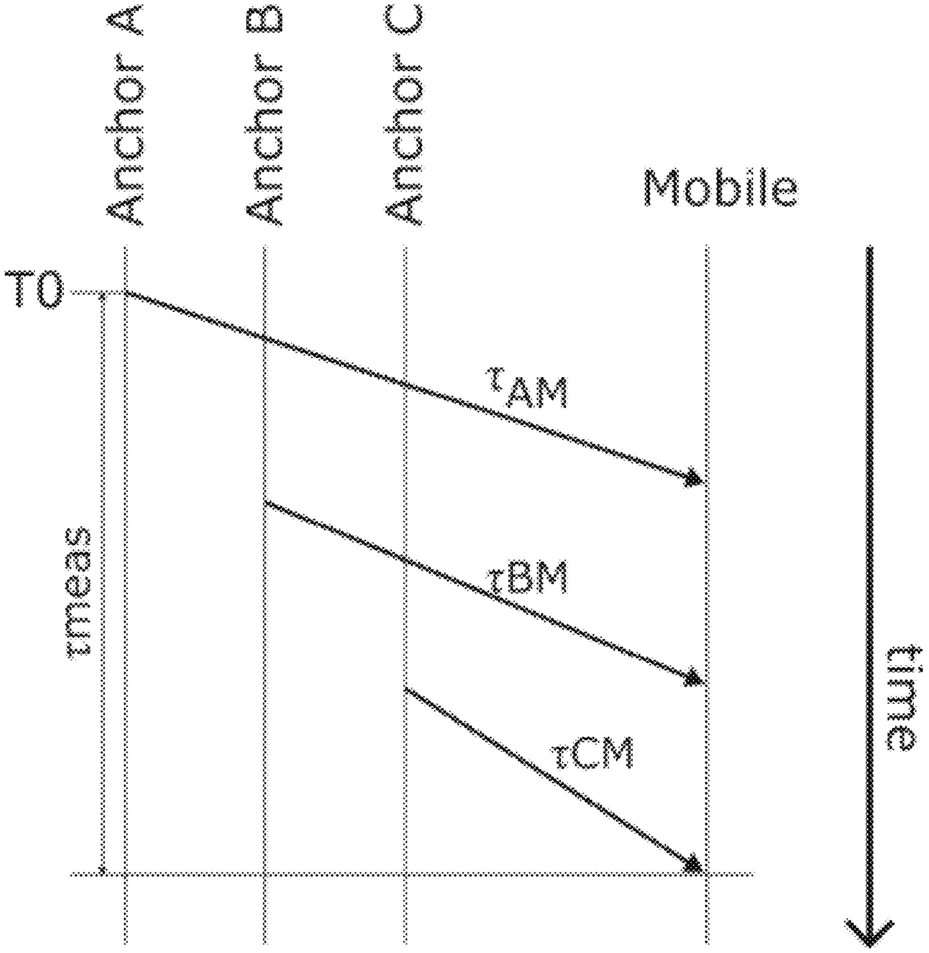
FIG. 3 illustrates a timing diagram of a localization determination using multiple anchors, in accordance with the example embodiments.

Furthermore, for embodiments in which the anchor nodes or static communication nodes 22*a*, 22*b*, 22*c* (or more simply, "anchors") are synchronized (e.g., time-synchronized), single-direction ranging measurement can be sufficient to calculate the location of the mobile node. A drawback of the localization procedure is that multiple ranging measurements need to be performed consecutively to determine the location, depending on the number of anchors. The timeline of this is shown in FIG. 3. The vertical dimension is time.

According to FIG. 3, the time it takes for the respective radio signal to go from anchor A to mobile node M (τAM), the time it takes for the respective radio signal to go from anchor B to mobile node M (τBM), and the time it takes for the respective radio signal to go from anchor C to mobile node M (τCM) are illustrated. Additionally, a respective measurement time (e.g., a ranging measurement time) (τeas) is also illustrated.

The location of the anchors (i.e., anchor A, anchor B, and anchor C) represented in FIG. 3 does not necessarily represent a physical location of those anchors. In accordance with FIG. 3, firstly, anchor A sends a packet to the mobile node M. Once this transmission is fully received, anchor B can send a packet to mobile node M, and then anchor C can send a packet to mobile node M.

The anchor transmissions, such as the transmissions shown in FIG. 3, can occur consecutively because the mobile node may have only one receiver, or multiple receivers operating at the same frequency. The anchors may not send simultaneously at the same frequency because their signals could collide in the air, but the anchors may send at the same frequency because the traditional receiver may only receive one frequency at a time.

Accordingly, for arrangements using common mobile nodes or common wireless communication devices, respectively, and in a full ranging measurement, all anchors communicate with the mobile node consecutively. This results in a slow update rate of the location, and the radio channel in the air is used for a long time and hence cannot be used by other devices. Also, the mobile node may need to be active for a long time to receive all the signals. In contrast, the example embodiments include embodiments that provide a wireless communication device having a receiver architecture that is able to receive the ranging packets of the anchors or the static communication nodes, respectively, simultaneously.

At least some of the example embodiments include ranging simultaneously to multiple anchors to have a very accurate single shot position even when moving at high speed. This can occur when anchors are synchronized and one way ranging can be used. Obtaining such accuracy with conventional systems would likely need an order of magnitude or more increase in update rate of the conventional systems.

Figure 4:
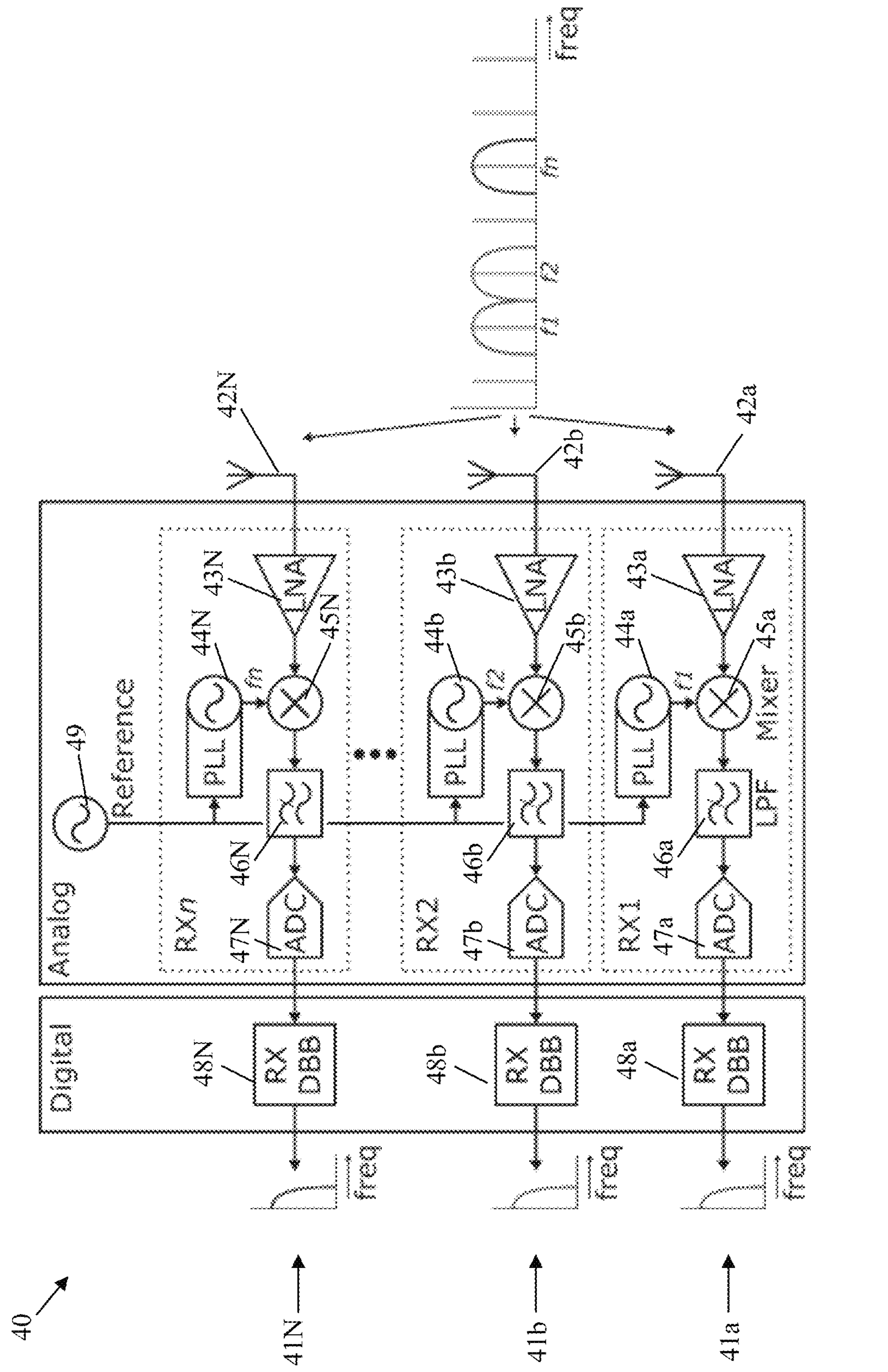
FIG. 4 shows a wireless communication device and/or multi-receiver ranging architecture, in accordance with the example embodiments.

Next, FIG. 4 shows a wireless communication device and/or multi-receiver ranging architecture 40 in accordance with the example embodiments.

According to FIG. 4, the wireless communication device and/or multi-receiver ranging architecture 40 comprises n receive chains 41*a*, 41*b*, . . . , 41N. Each of the receive chains 41*a*, 41*b*, . . . , 41N comprises a receive antenna 42*a*, 42*b*, . . . , 42N connected to an input of a respective low noise amplifier (LNA) 43*a*, 43*b*, . . . , 43N. With the aid of a corresponding mixer 45*a*, 45*b*, . . . , 45N, the output of the low noise amplifier 43*a*, 43*b*, . . . , 43N is mixed with an output of a respective phase-locked loop (PLL) 44*a*, 44*b*, . . . , 44N. The output of the mixer 45*a*, 45*b*, . . . , 45N is passed through a respective low pass filter 46*a*, 46*b*, . . . , 46N to a corresponding analog-to-digital converter (ADC) 47*a*, 47*b*, . . . , 47N. The output of the analog-to-digital converter 47*a*, 47*b*, . . . , 47N is passed to a respective digital receive portion 48*a*, 48*b*, . . . , 48N of the wireless communication device and/or multi-receiver ranging architecture 40.

The total number of receive chains 41*a*, 41*b*, . . . , 41N in the wireless communication device and/or multi-receiver ranging architecture 40 can be n for simultaneous reception from n anchors or static communication nodes, respectively. In accordance with at least some embodiments, each of the receive chains 41*a*, 41*b*, . . . , 41N has its own PLL 44*a*, 44*b*, . . . , 44N. This enables each receive chain 41*a*, 41*b*, . . . , 41N to tune into a different frequency and receive from a different anchor or static communication node, respectively. The wireless communication device and/or multi-receiver ranging architecture 40 can be referred to as a receiver.

In accordance with at least some embodiments, the PLL 44*a*, 44*b*, . . . , 44N includes a respective, full PLL. In accordance with at least some other embodiments, a respective local oscillator, such as a local oscillator with sufficient frequency stability, can be used in lieu of a PLL among the PLL 44*a*, 44*b*, . . . , 44N.

Figure 5:
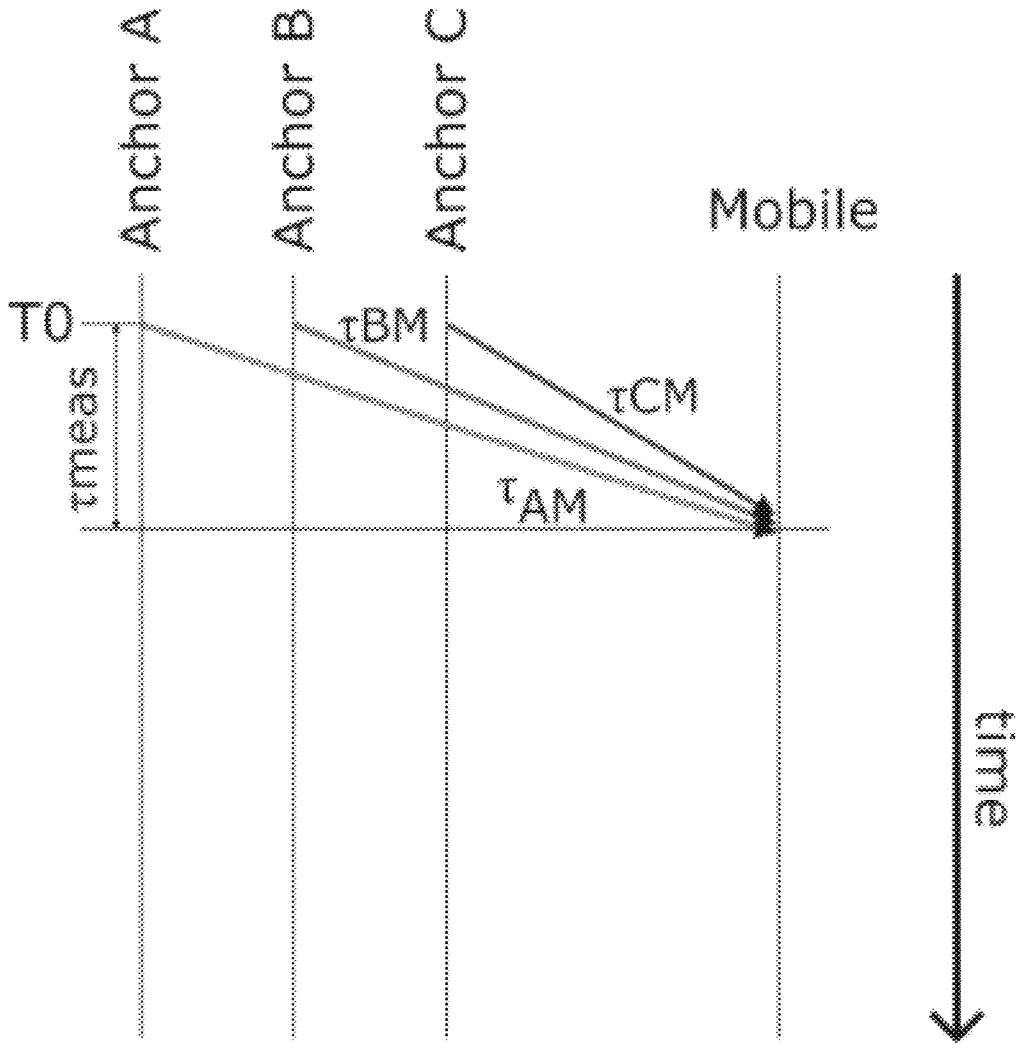
FIG. 5 shows a timing diagram of a localization determination, in accordance with the example embodiments.

Next, FIG. 5 shows a timing diagram (e.g., a timeline) of a localization measurement in accordance with the example embodiments, such as the embodiment shown in and/or discussed with respect to FIG. 4. The measurement time of this simultaneous ranging is much shorter than the traditional approach of consecutive ranging measurements.

According to FIG. 5, the time it takes for the respective radio signal to go from anchor A to mobile node M (τAM), the time it takes for the respective radio signal to go from anchor B to mobile node M (τBM), and the time it takes for the respective radio signal to go from anchor C to mobile node M (τCM) are illustrated. Additionally, the respective measurement time (τmeas) is also illustrated, which is shorter than the measurement time represented in FIG. 3.

Again, with respect to FIG. 4, each receive chain 41*a*, 41*b*, . . . , 41N has a receive antenna 42*a*, 42*b*, . . . , 42N, respectively, which can be physically separated. In this context, the physical separation of antennas means that the antennas are spatially divided and not connected electrically to each other.

It is further noted that the calculated range is between the anchor antenna and the receive chain antenna. Hence, the calculated location depends on the orientation of the antennas and therefore the orientation of the device. Accordingly, for instance, a topology according to FIG. 6A comprising an individual antenna 61*a*, 61*b*, . . . , 61N for each receive chain

60a, 60b, . . . , 60N can imply an orientation dependency with respect to localization determination.

Figures 6A, 6B, 6C, 6D:
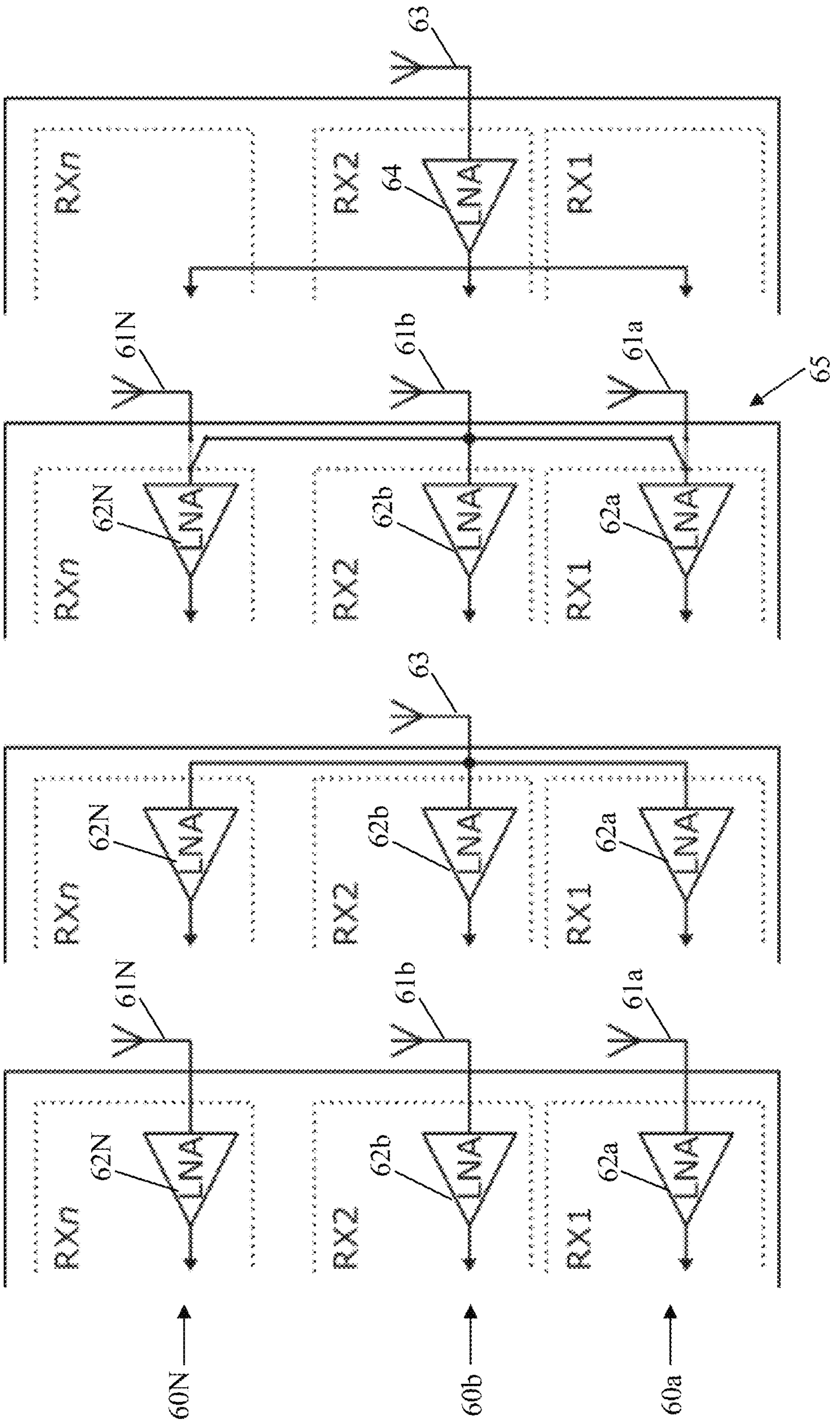
FIG. 6A shows an embodiment corresponding to a wireless communication device with localization capabilities, in accordance with the example embodiments.
FIG. 6B depicts a further embodiment corresponding to a wireless communication device with localization capabilities, in accordance with the example embodiments.
FIG. 6C illustrates a further embodiment corresponding to a wireless communication device with localization capabilities, in accordance with the example embodiments.
FIG. 6D shows a further embodiment corresponding to a wireless communication device with localization capabilities, in accordance with the example embodiments.

In addition to this, with respect to FIG. 6A, each antenna 61a, 61b, . . . , 61N is connected to a corresponding low noise amplifier 62a, 62b, . . . , 62N.

To prevent the above-mentioned orientation dependency, the receive chains 60a, 60b, . . . , 60N can be connected to a single antenna 63, as shown in FIG. 6B. Using this topology, all ranging measurements can be performed with respect to the single antenna 63, hence the calculated location does not have an orientation dependence.

Another option to connect multiple receiver chains 60a, 60b, . . . , 60N to a single antenna 63 is shown in FIG. 6D, where the received signal is split to the multiple receive chains 60a, 60b, . . . , 60N after a low noise amplifier (e.g., a single, low noise amplifier 64). For the sake of completeness, it should be mentioned that a downside of these single-antenna architectures is that Angle-of-Arrival (AoA) measurements are not possible anymore because there is no physical separation between the antennas of the receive chains.

In accordance with embodiments in which AoA is to be supported, antenna switches can be used to switch between using a single antenna or individual antennas, as shown in FIG. 6C. As an example, the antenna switches can comprise and/or be arranged as a switch matrix 65.

Moreover, in accordance with embodiments in which anchors or static communication nodes, respectively, are not time-synchronized or time-aligned, a moment of departure of the ranging packets from the anchors to the mobile node or wireless communication node, respectively, is typically not accurately known.

Figure 7A:
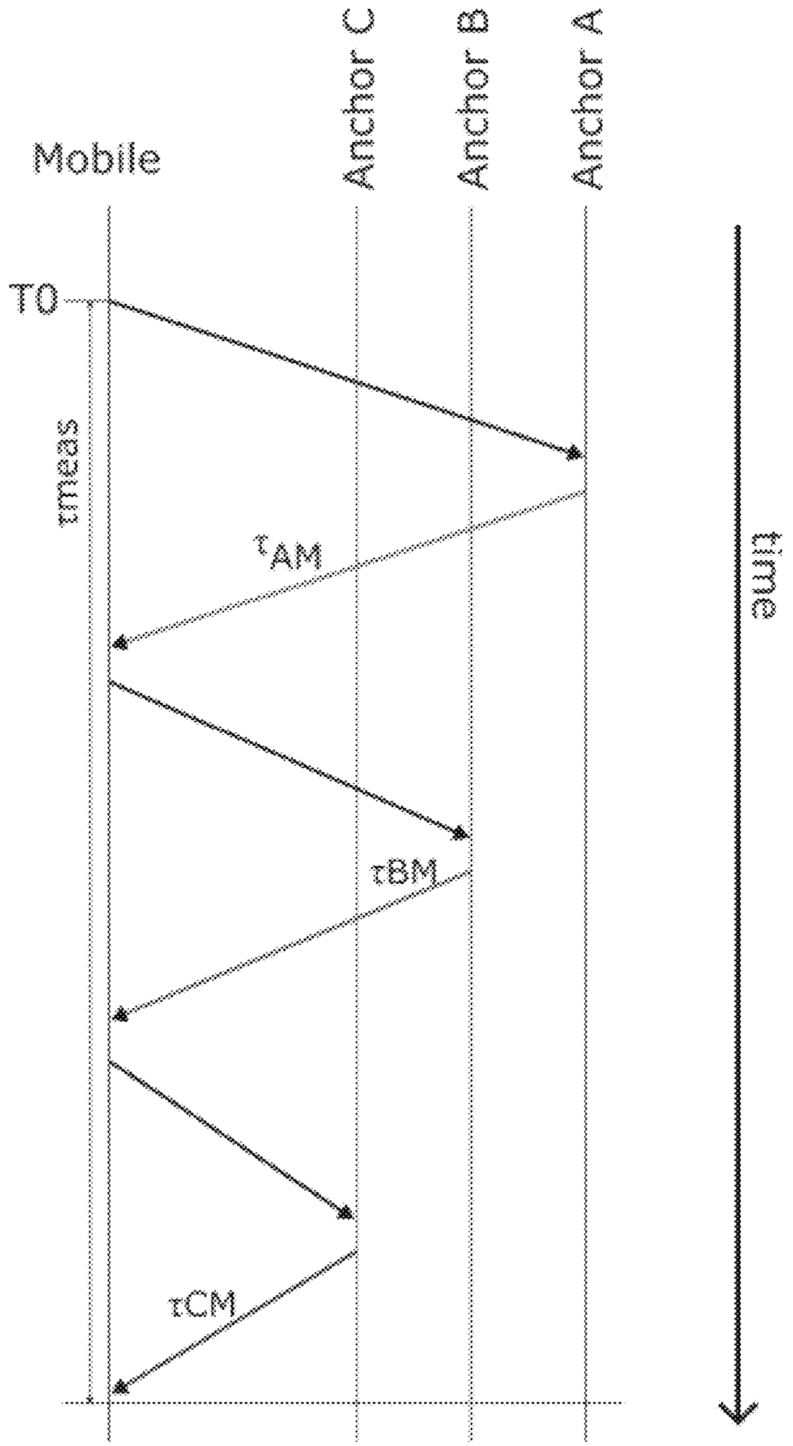
FIG. 7A depicts a further timing diagram of localization determination, in accordance with the example embodiments.
Figure 7B:
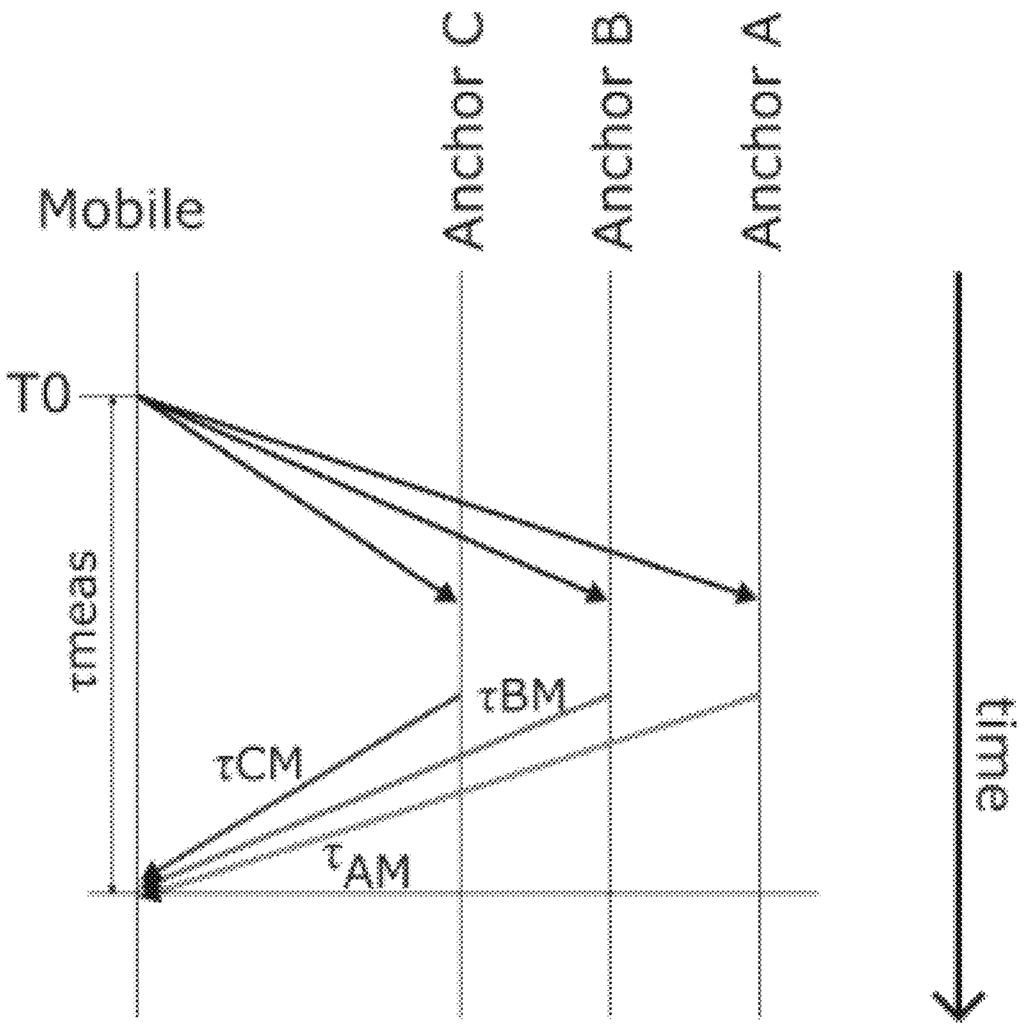
FIG. 7B illustrates a further timing diagram of localization determination, in accordance with the example embodiments.

In those and/or other embodiments, two-way ranging can be performed. FIG. 7A and FIG. 7B both show a timing diagram (e.g., a timeline). In particular, FIG. 7A shows a timeline corresponding to two-way ranging in a manner that ranging with respect to each anchor is done in a sequential manner. In contrast, FIG. 7B shows a timeline corresponding to the ranging with respect to each anchor is performed in parallel.

In this way, the anchors or static communication nodes, respectively, can be synchronized by the packet from the mobile node or wireless communication node, respectively.

With respect to the synchronization in the context of FIG. 7B or otherwise, as the packet (such as a single packet) from the mobile node or wireless communication node, respectively, arrives at the anchors or static communication nodes, respectively, typically at different points in time because of respective path length differences, the time of flight of this packet from the mobile node to the anchors can be used in the corresponding ranging determination.

Additionally, in at least some embodiments, the above-mentioned packet (such as the single packet) is transmitted at the same frequency to each of the anchors, whereas the corresponding answer packets can be transmitted at different frequencies from the anchors. In other words, each anchor or each static communication node, respectively can use its own frequency for answering or transmitting information, respectively.

Furthermore, according to FIG. 7A or FIG. 7B, respectively, the time it takes for the respective radio signal to go from anchor A to mobile node M ($\tau$AM), the time it takes for the respective radio signal to go from anchor B to mobile node M ($\tau$BM), and the time it takes for the respective radio signal to go from anchor C to mobile node M ($\tau$CM) are illustrated. Additionally, the respective measurement time ($\tau$meas) is also illustrated.

Returning to FIG. 4, to enable Angle-of-arrival measurements with the receive chains 41a, 41b, . . . , 41N, there can be a common reference 49 to connect to each of the phase-locked loops 44a, 44b, . . . , 44N. In this manner, the receivers can be sufficiently phase-aligned.

Furthermore, since some anchors can be far away and others close by the mobile node, the received signal strength can be different at different channels. Accordingly, the receivers can have a high Adjacent Channel Rejection (ACR). In other words, the receivers can sufficiently suppress the energy in all channels but the one being received by that particular receiver chain.

Additionally or alternatively, the anchors can be configured so that the received power of each receive chain is approximately equal by adapting their output power. This can be achieved if the mobile node indicates to the anchors what the received signal strength of each channel was in the previous ranging measurement, or if the approximate location of the mobile node is known.

Moreover, at least some of the example embodiments can also be applied to phase-based ranging and received signal strength indicator based ranging. Additionally or alternatively, at least some of the example embodiments can work with other types of receivers, not just the zero intermediate frequency receiver as in the example depicted in FIG. 4.

Figure 8:
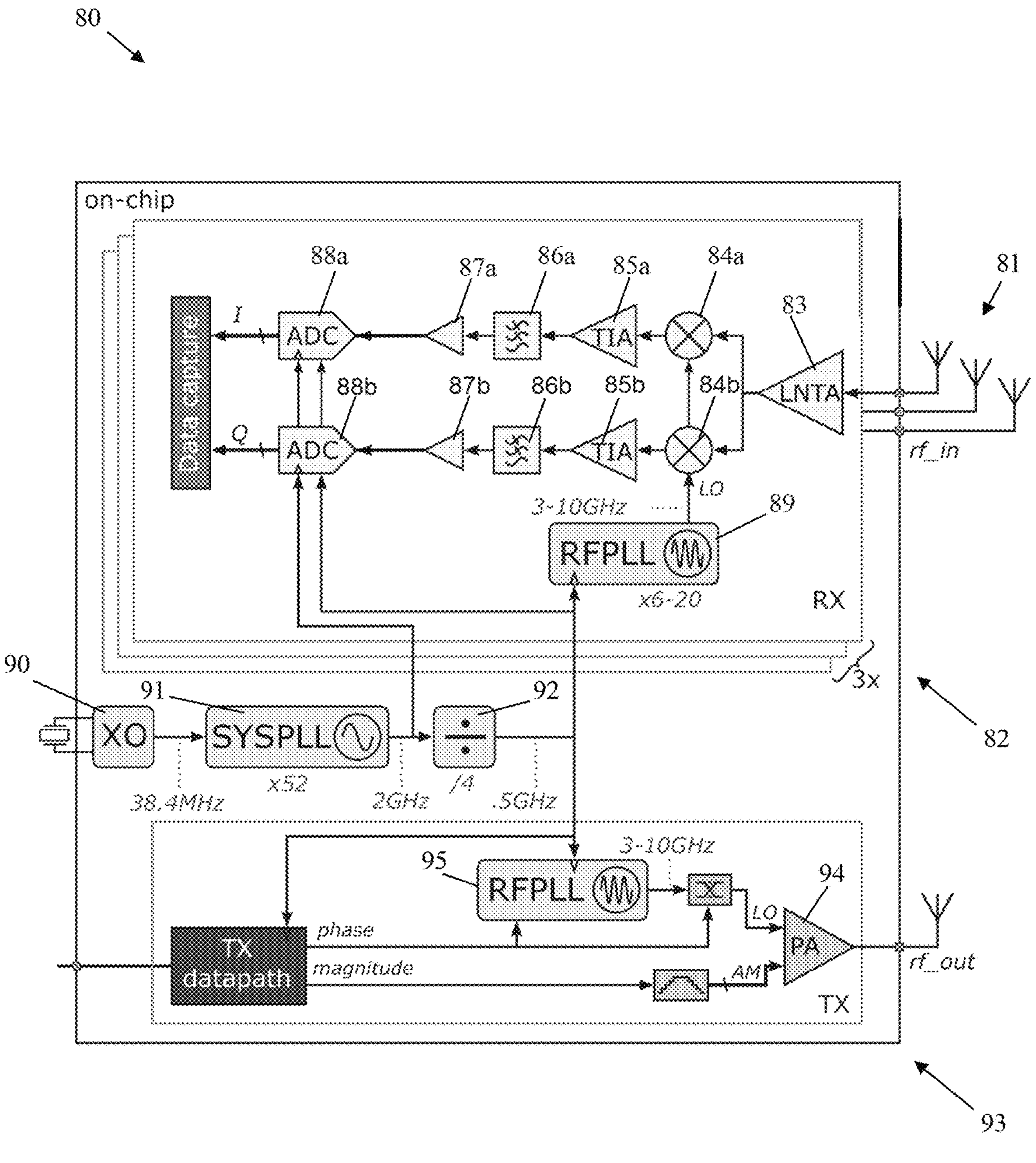
FIG. 8 shows a block diagram of a transceiver, in accordance with the example embodiments.

Next, FIG. 8 depicts a transceiver 80. As an example, the transceiver 80 includes and/or is arranged as an IR-UWB (impulse radio ultra-wideband) transceiver. The transceiver 80 comprises a system clock generator 91, along with a transmitter 93 (such as an energy-efficient asynchronous polar transmitter), receive antennas 81, and three receivers 82 with self-contained PLLs such as a PLL 89.

The transmitter 93 can be arranged with a polar architecture, enabling low power consumption. As an example, a respective sidelobe suppression could be <−28 dBr, which can be achieved by using a digital power amplifier (PA) 94. In some embodiments, the digital power amplifier 94 is used in combination with an asynchronous digital pulse shaper.

A receiver, such as each of the receivers 82, can comprise a two-stage LNTA (Low-noise transconductance amplifier) 83. The receiver 82 also comprises passive mixers 84a and 84b, TIAs (Transimpedance amplifier) 85a and 85b, low pass filters 86a and 86b, amplifiers 87a and 87b, and analog-to-digital converters (ADC) 88a and 88b for the I-path and Q-path, respectively.

In at least some of the example embodiments, all amplifiers in the receiver or each of the receivers 82, respectively, comprises unit inverter-based gm cells. In at least some of those embodiments, the unit inverter-based gm cells are regulated by a self-biased current regulator.

For instance, the ADC, such as the ADC 88a or the ADC 88b, can be a 2 Giga-Sample per second (GSps) 6-bit 2×time-interleaved (TI) ADC. Such ADC can be a trade-off between TI complexity and slice sample rate. Furthermore, in at least some embodiments, the two respective most-significant bits (MSB) can be resolved using a loop-unrolled, successive approximation registers (SAR) architecture. The remaining 4 bits can, for example, be generated by an asynchronous digital slope ADC. The calibration of the offset of the SAR comparators and digital-slope comparator especially guarantees performance over process, voltage, temperature (PVT) corners and mismatch.

Furthermore, the output of each receiver 82 can be captured on an on-chip memory for offline evaluation of a portion of or the whole receiver chain. In accordance with at least some embodiments, center frequencies of all the channels are integer multiples of 499.2 MHz, enabling a clock-generation approach using two cascaded integer PLLs.

A distributed, cascaded PLL architecture consisting of a system clock PLL (SYSPLL) 91 and multiple TX/RX local PLLs (RF-PLLs) 89, 95 can be provided to enable low-power clock distribution, as well as simultaneous reception of up to three different channels to receive signals from three transmitters simultaneously. Using the multi-channel reception, the ranging throughput is increased 3×, resulting in a three-fold reduction in the measurement time or a three-fold increase in the update rate, leading to a significant improvement in precision.

Figure 9:
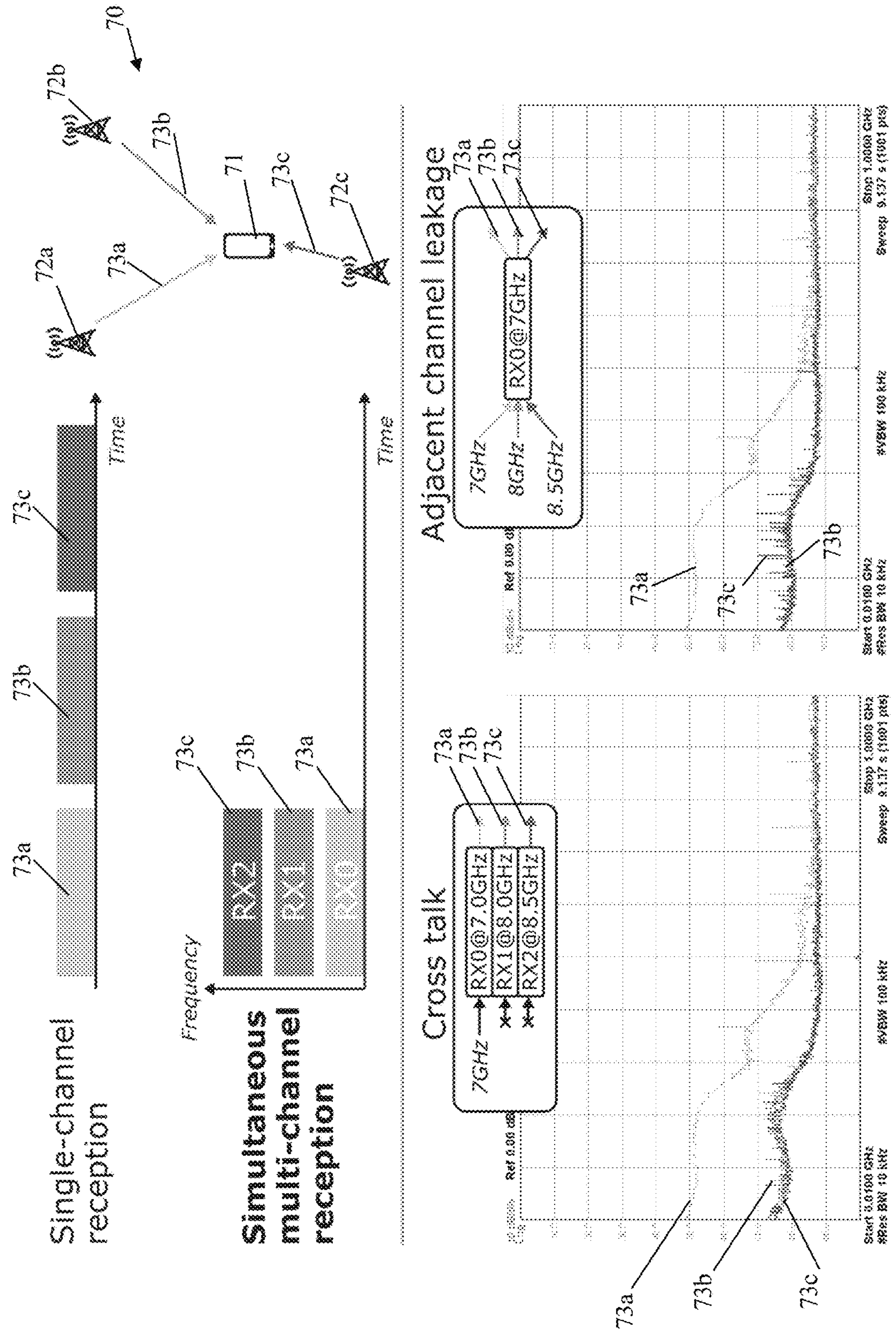
FIG. 9 illustrates a reduction of ranging time for a system, in accordance with the example embodiments.

Next, FIG. 9 illustrates simultaneous multi-channel reception with respect to single-channel reception. As an example, with a reference clock of 38.4 MHz from the crystal oscillator (XO) 90 according to FIG. 8, the SYSPLL 91 can provide a 1,996.8 MHz clock for the receiver ADCs, such as ADC 88*a*. Moreover, with the aid of the divider 92, the SYSPLL 91 can provide a 499.2 MHz clock as the system clock and a reference of the transmitter and receiver RFPLLs 95, 89.

FIG. 9 also shows a system 70 according to the second aspect of the disclosure. The system 70 comprises a mobile node or a wireless communication device 71, and three anchor nodes or three static communication nodes 72*a*, 72*b*, 72*c*, respectively. In this context, the wireless communication device 71 can receive three signals (e.g., a signal 73*a*, 73*b*, 73*c*) from the static communication nodes 72*a*, 72*b*, 72*c*, respectively.

Additionally, FIG. 9 illustrates the simultaneous reception of three corresponding, different channels, where crosstalk and adjacent-channel leakage (ACL) are major challenges. The crosstalk and ACL can be >20 dB below the desired signal, thus providing the required signal-to-noise ratio (SNR) for accurate simultaneous ranging measurements.

Figure 10:
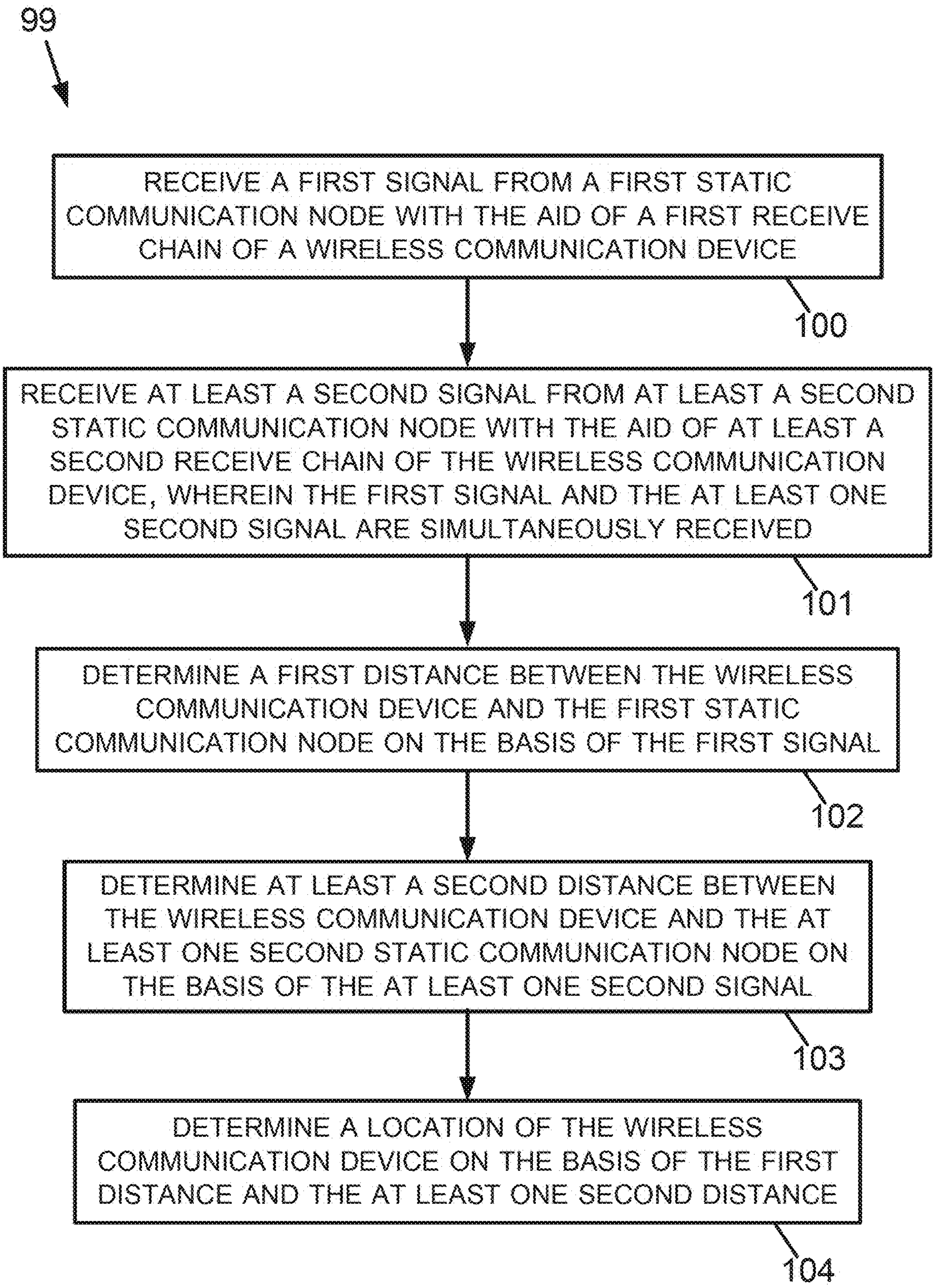
FIG. 10 shows a flow chart showing functions of a method, in accordance with the example embodiments.

Next, FIG. 10 shows a flowchart 99 showing functions of a method (e.g. a wireless communication method with localization capabilities) in accordance with the example embodiments.

At block 100, a first signal is received from a first static communication node with the aid of a first receive chain of a wireless communication device.

At block 101, at least a second signal is received from at least a second static communication node with the aid of at least a second receive chain of the wireless communication device. In accordance with at least some embodiments, the first signal and the at least one second signals are simultaneously received.

Next, at block 102, a first distance between the wireless communication device and the first static communication node is determined on the basis of the first signal.

Next, at block 103, at least a second distance between the wireless communication device and the at least one second static communication node is determined on the basis of the at least one second signal.

Next, at block 104, a location of the wireless communication device is determined on the basis of the first distance and the at least one second distance.

In accordance with at least some of the example embodiments, the functions shown in two or more of the blocks in the flowchart 99 can be performed simultaneously. For example, the functions in block 102 and block 103 can be performed simultaneously.

In accordance with at least some of the example embodiments, the method represented by the flowchart 99 can further include tuning into a different frequency with respect to each other with the aid of each of the first and at least one second receive chains. Additionally or alternatively, the method represented by the flowchart 99 can further include independently, generating a corresponding local oscillator signal with respect to each other with the aid of each of the first receive chain and the at least one second receive chain.

In accordance with at least some of the example embodiments, receiving the at least one second signal from the at least one second static communication node with the aid of the at least one second receive chain of the wireless communication device can comprise receiving a second signal and a third signal from a second static communication node and a third static communication node with the aid of a second receive chain and a third receive chain of the wireless communication device. These additional embodiment(s) can be useful for trilateration.

In accordance with at least some of the example embodiments, determining the at least one second distance between the wireless communication device and the at least one second static communication node on the basis of the at least one second signal can comprise determining a second distance between the wireless communication device and the second static communication node on the basis of the second signal, and determining a third distance between the wireless communication device and the third static communication node on the basis of the third signal. These additional embodiment(s) can be useful for trilateration.

In accordance with at least some of the example embodiments, such as the embodiments discussed in the preceding paragraph, determining the location of the wireless communication device on the basis of the first distance and the at least one second distance can comprise determining the location of the wireless communication device on the basis of the first, second, and third distances. These additional embodiment(s) can be useful for trilateration.

In accordance with at least some of the example embodiments, the first receive chain can comprise a first phase-locked loop. Additionally or alternatively, the at least one second receive chain can comprise at least a second phase-locked loop.

In accordance with at least some of the example embodiments, the first distance can be determined on the basis of time-of-flight measurements and/or phase-based ranging and/or signal-strength measurements with respect to the first signal. In other words, a method based on one or more functions of the flowchart 99 can further comprise determining the first distance on the basis of time-of-flight measurements and/or phase-based ranging and/or signal-strength measurements with respect to the first signal.

Additionally or alternatively, in accordance with at least some of the example embodiments, the at least one second distance can be determined on the basis of time-of-flight measurements and/or phase-based ranging and/or signal-strength measurements with respect to the at least one second signal. In other words, a method (e.g., a method based on one or more functions of the flowchart 99) can further comprise determining the at least one second distance on the basis of time-of-flight measurements and/or phase-based ranging and/or signal-strength measurements with respect to the at least one second signal.

In accordance with at least some of the example embodiments, the wireless communication device can further comprise at least one transmit chain. In this context, the at least one transmit chain can be configured to send a synchronization signal to at least one (for example, each) of the first and the at least one second static communication nodes in order to synchronize the first and at least one second static communication nodes.

In accordance with at least some of the example embodiments, a method (e.g., a method based on one or more functions of the flowchart 99) can further comprise configuring at least one transmit chain of the wireless communication device to send a synchronization signal to at least one (for example, each) of the first and the at least one second static communication nodes in order to synchronize the first and at least one second static communication nodes.

In accordance with at least some of the example embodiments, the first receive chain can comprise a first receive antenna. Additionally or alternatively, the at least one second receive chain can comprise at least a second receive antenna.

In accordance with at least some of the example embodiments, the wireless communication device can comprise a single receive antenna. As an example, the single receive antenna can be configured to provide its corresponding receive signal for at least one (for example, each) of the first receive chain and the at least one second receive chain. In other words, a method (e.g., a method based on one or more functions of the flowchart 99) can include configuring a single receive antenna of the wireless communication device to provide its corresponding receive signal for at least one (for example, each) of the first receive chain and the at least one second receive chain.

In accordance with at least some of the example embodiments, the wireless communication device further comprises a switch matrix. As an example, the switch matrix can be configured to switch at least one (for example, each) of the first receive antenna and the at least one second receive antenna so that one of the first receive antenna and the at least one second receive antenna is configured as a single receive antenna providing its corresponding receive signal for at least one (for example, each) of the first and at least one second receive chains.

In accordance with at least some of the example embodiments, a method (e.g., a method based on one or more functions of the flowchart 99) can further include configuring a switch matrix of the wireless communication device to switch at least one (for example, each) of the first receive antenna and the at least one second receive antenna so that one of the first receive antenna and the at least one second receive antenna is configured as a single receive antenna providing its corresponding receive signal for at least one (for example, each) of the first receive chain and the at least one second receive chain.

In accordance with at least some of the example embodiments, the at least one second receive chain can comprise a second receive chain and a third receive chain. Alternatively, the at least one second receive chain can comprise a second receive chain, a third receive chain, and at least a fourth receive chain. These additional embodiment(s) can be useful for trilateration.

While various embodiments of the present disclosure have been described above, it should be understood that they have been presented by way of example only, and not limitation. Numerous changes to the disclosed embodiments can be made in accordance with the disclosure herein without departing from the spirit or scope of the disclosure. Thus, the breadth and scope of the present disclosure should not be limited by any of the above described embodiments. Rather, the scope of the disclosure should be defined in accordance with the claims and their equivalents. Furthermore, although the example embodiments have been illustrated and described with respect to one or more implementations, equivalent alterations and modifications will occur to others skilled in the art upon the reading and understanding of this specification and the annexed drawings. In addition, while a particular feature of the disclosure may have been disclosed with respect to only one of several implementations, such feature may be combined with one or more other features of the other implementations as may be desired and advantageous for any given or particular application.

Finally, while some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

What is claimed is:

1. A wireless communication device with localization capabilities, the wireless communication device comprising:

a first receive chain for receiving a first signal from a first static communication node, and at least one second receive chain for receiving at least one second signal from at least one second static communication node, wherein the first receive chain and the at least one second receive chain are configured to receive the first signal and the at least one second signal, respectively, as part of two-way ranging performed in parallel, and wherein the wireless communication device is configured to:

determine a first distance between the wireless communication device and the first static communication node based on the first signal received by the first receive chain as part of the two-way ranging performed in parallel, determine at least one second distance between the wireless communication device and the at least one second static communication node based on the at least one second signal received by the at least one second receive chain as part of the two-way ranging performed in parallel, and determine a location of the wireless communication device based on the first distance and the at least one second distance.

2. The wireless communication device according to claim 1, wherein each of the first receive chain and the at least one second receive chain is configured to tune into a different frequency with respect to each other.

3. The wireless communication device according to claim 1, wherein each of the first receive chain and the at least one second receive chain is configured to independently generate a corresponding local oscillator signal with respect to each other.

4. The wireless communication device according to claim 1, wherein the first receive chain comprises a first phase-locked loop, and/or wherein the at least one second receive chain comprises at least a second phase-locked loop.

5. The wireless communication device according to claim 1, wherein:

the first distance is determined based on one or more from among: time-of-flight measurements, phase-based ranging, or signal-strength measurements with respect to the first signal, and/or the at least one second distance is determined based on one or more from among: time-of-flight measurements, phase-based ranging, or signal-strength measurements with respect to the at least one second signal.

6. The wireless communication device according to claim 1, wherein the wireless communication device further comprises at least one transmit chain, wherein the at least one transmit chain is configured to send a synchronization signal to the first static communication node and/or the at least one second static communication node to synchronize the first static communication node and the at least one second static communication node, and/or wherein the at least one transmit chain is configured to request the first signal from the first static communication node and the at least one second signal from the at least one second static communication node with aid of a corresponding request signal.

7. The wireless communication device according to claim 6, wherein the corresponding request signal includes a corresponding request signal at the same frequency.

8. The wireless communication device according to claim 6, wherein the corresponding request signal includes a single request signal at the same frequency.

9. The wireless communication device according to claim 6, wherein the corresponding request signal includes a single request signal at the same frequency for each of the first static communication node and the at least one second static communication node.

10. The wireless communication device according to claim 1, wherein the first receive chain comprises a first receive antenna, and/or wherein the at least one second receive chain comprises at least one second receive antenna.

11. The wireless communication device according to claim 10, wherein the wireless communication device further comprises a switch matrix, wherein the switch matrix is configured to switch at least one of the first receive antenna or the at least one second receive antenna so that one of the first receive antenna or the at least one second receive antenna is configured as a single receive antenna providing its corresponding receive signal for at least one of the first receive chain or the at least one second receive chain.

12. The wireless communication device according to claim 11, wherein the switch matrix is configured to switch each of the first receive antenna and the at least one second receive antenna so that one of the first receive antenna or the at least one second receive antenna is configured as a single receive antenna providing its corresponding receive signal for each of the first receive chain and the at least one second receive chain.

13. The wireless communication device according to claim 1, wherein the wireless communication device comprises a single receive antenna, and wherein the single receive antenna is configured to provide its corresponding receive signal for at least one of the first receive chain or the at least one second receive chain.

14. The wireless communication device according to claim 13, wherein the single receive antenna is configured to provide its corresponding receive signal for each of the first receive chain and the at least one second receive chain.

15. The wireless communication device according to claim 1, wherein the at least one second receive chain comprises a second receive chain and a third receive chain, or wherein the at least one second receive chain comprises a second receive chain, a third receive chain, and at least a fourth receive chain.

16. A system comprising:

at least one wireless communication device according to claim 1, the first static communication node, and the at least one second static communication node.

17. The system according to claim 16, wherein the first static communication node and the at least one second static communication node are synchronized with respect to each other.

18. The wireless communication device according to claim 1, wherein the first receive chain and the at least one second receive chain are configured to simultaneously receive the first signal and the at least one second signal, respectively.

19. A wireless communication method with localization capabilities, the wireless communication method comprising:

receiving a first signal from a first static communication node with aid of a first receive chain of a wireless communication device, receiving at least one second signal from at least one second static communication node with aid of at least one second receive chain of the wireless communication device, wherein the first signal and the at least one second signal are received as part of two-way ranging performed in parallel, determining a first distance between the wireless communication device and the first static communication node based on the first signal received by the first receive chain as part of the two-way ranging performed in parallel, determining at least one second distance between the wireless communication device and the at least one second static communication node based on the at least one second signal received by the at least one second receive chain as part of the two-way ranging performed in parallel, and determining a location of the wireless communication device based on the first distance and the at least one second distance.

20. The wireless communication method according to claim 19, further comprising:

tuning into a different frequency with respect to each other with the aid of each of the first receive chain and the at least one second receive chain, and/or independently generating a corresponding local oscillator signal with respect to each other with the aid of each of the first receive chain and the at least one second receive chain.

21. The wireless communication method according to claim 19, wherein receiving the at least one second signal from the at least one second static communication node with the aid of the at least one second receive chain of the wireless communication device comprises receiving a second signal and a third signal from a second static communication node and a third static communication node with the aid of a second receive chain and a third receive chain of the wireless communication device, and/or wherein determining the at least one second distance between the wireless communication device and the at least one second static communication node based on the at least one second signal comprises determining a second distance between the wireless communication device and the second static communication node based on the second signal, and determining a third distance between the wireless communication device and the third static communication node based on the third signal, and/or wherein determining the location of the wireless communication device based on the first distance and at least one second distance comprises determining the location of the wireless communication device based on the first, second, and third distances.

22. The wireless communication method according to claim 19, wherein receiving the first signal and receiving the at least one second signal occurs simultaneously by the first receive chain and the second receive chain respectively.

* * * * *